(12) United States Patent
Das et al.

(10) Patent No.: US 8,954,261 B2
(45) Date of Patent: Feb. 10, 2015

(54) AUTONOMOUS VEHICLE POSITIONING SYSTEM FOR MISBEHAVIOR DETECTION

(75) Inventors: Sushanta Das, Karnataka (IN); Mounita Saha, Karnataka (IN)

(73) Assignee: GM Global Technology Operations LLC, Detroit, MI (US)

(*) Notice: Subject to any disclaimer, the term of this patent is extended or adjusted under 35 U.S.C. 154(b) by 0 days.

(21) Appl. No.: 13/526,760

(22) Filed: Jun. 19, 2012

(65) Prior Publication Data

US 2013/0297195 A1   Nov. 7, 2013

(30) Foreign Application Priority Data

May 3, 2012   (IN) .............................. 491/KOL/2012

(51) Int. Cl.
*G06F 19/00* (2011.01)
*G08G 1/00* (2006.01)
*G01S 3/02* (2006.01)
*H04L 9/32* (2006.01)

(52) U.S. Cl.
USPC ............ 701/117; 701/116; 342/457; 713/168

(58) Field of Classification Search
USPC .................. 701/117, 119; 342/465; 370/315; 455/456.2, 456.3; 713/168
See application file for complete search history.

(56) References Cited

U.S. PATENT DOCUMENTS

| | | | |
|---|---|---|---|
| 6,119,013 A | 9/2000 | Maloney et al. | |
| 6,862,524 B1 | 3/2005 | Nagda et al. | |
| 6,867,733 B2 | 3/2005 | Sandhu et al. | |
| 6,985,103 B2 | 1/2006 | Ridderheim et al. | |
| 7,626,546 B2 | 12/2009 | Chung et al. | |
| 7,711,375 B2 | 5/2010 | Liu | |
| 7,859,465 B2 * | 12/2010 | Wu | 342/465 |

(Continued)

FOREIGN PATENT DOCUMENTS

| | | |
|---|---|---|
| DE | 10314169 | 3/2003 |
| DE | 102010002883 | 7/2010 |

(Continued)

OTHER PUBLICATIONS

Boukerche et al., "Secure Localization Algorithms for Wireless Sensor Networks", Apr. 2008, IEEE Communications Magazine, p. 96-101.*

(Continued)

*Primary Examiner* — Fadey Jabr
*Assistant Examiner* — Aaron L Troost

(57) ABSTRACT

An autonomous vehicle positioning system for determining a position of a remote vehicle relative to a mobile host vehicle based on safety alert messages broadcast from the remote vehicle relating to an event in a road of travel. A host vehicle communication unit communicates with the remote vehicle for receiving the broadcast messages from the remote vehicle. A host vehicle control unit identifies reference points along the road of travel. Each reference point identifies a position of the host vehicle and associated signal reception properties, for example time-of-arrival, angle-of-arrival and received signal strength when the host vehicle receives the broadcast message. The control unit of the host vehicle selects a set of the reference points having identified positions and associated times, angles and signal strength. The control unit determines a position of the remote vehicle as a function of the time difference-of-arrival, angle-of-arrival or received signal strength between each selected reference point in the set.

24 Claims, 4 Drawing Sheets

(56) References Cited

U.S. PATENT DOCUMENTS

| | | | |
|---|---|---|---|
| 2006/0052115 A1* | 3/2006 | Khushu | 455/456.3 |
| 2007/0032245 A1 | 2/2007 | Alapuranen | |
| 2008/0234930 A1 | 9/2008 | Cheok et al. | |
| 2009/0271112 A1 | 10/2009 | Basnayake | |
| 2009/0312037 A1* | 12/2009 | Jo et al. | 455/456.2 |
| 2009/0323579 A1* | 12/2009 | Bai et al. | 370/315 |
| 2011/0074643 A1 | 3/2011 | Baranski | |
| 2011/0112748 A1* | 5/2011 | Bauchot et al. | 701/119 |

FOREIGN PATENT DOCUMENTS

| | | |
|---|---|---|
| DE | 102009045748 | 4/2011 |
| EP | 0484895 | 1/1996 |
| WO | WO9909778 A1 | 2/1999 |

OTHER PUBLICATIONS

Boukerche, A., Oliveira, H.A.B., Nakamura, E.F., Loureiro, A.A.F.; Secure Localization Algorithms for Wireless Sensor Networkds; 2008; Communications Magazine, IEEE; vol. 46, Issue 4; p. 96-101.*

Bilstrup K, Uhlemann E, Strom E, Bilstrup U; Evaluation of the IEEE 802.1 Ip MAC method for vehicle-to-vehicle communication; In: 68th IEEE Vehicular Technology Conference, 2008; VTC 2008—Fall: IEEE Vehicular Technology Conference (VTC) (2008); Piscataway: IEEE; p. 1-5.*

Ghosh, M., Varghese, A., Kherani, A.A., Gupta, A; Distributed Misbehavior Detection in VANETs; Wireless Communications and Networking Conference, 2009; IEEE; p. 1-6.*

* cited by examiner

AUTONOMOUS VEHICLE POSITIONING SYSTEM FOR MISBEHAVIOR DETECTION

BACKGROUND OF INVENTION

An embodiment relates generally to vehicle-to-vehicle communication systems and vehicle positioning.

Vehicle-to-vehicle (V2V) communications is based on two-way communications for vehicles to interact in real time. These systems are preferably directed to traffic management, collision warning and collision avoidance, road and weather hazard notification. Such systems can extend a host vehicle's range of awareness of surrounding environmental conditions by providing relevant information regarding the status of traffic in addition to any safety related events occurring in proximity to or detected by vehicles near the host vehicle.

The V2V wireless message may be transmitted as a standard periodic beacon message. The wireless message includes data about environmental awareness conditions relating to vehicle positions, vehicle kinematics/dynamic parameters, traffic or road events sensed by respective remote vehicles. These environmental awareness conditions are communicated between vehicles to forewarn drivers of vehicles of some type of safety condition, traffic delays, accident, or current condition that could result in an accident. One of the objectives is to provide advance warning to neighboring vehicles of a condition so as to provide additional time to react to the condition. Such warnings for environmental awareness conditions may include, but are not limited to, traffic congestion, accidents, forward collision warnings (FCW), lateral collision warning (LCW), stopped vehicles ahead, emergency electronic brake light activation (EEBL), intersection collision warning/avoidance, straight crossing path, and working zone warning.

Spurious messages and misbehavior nodes are referred to as entities that communicate messages under false pretenses. That is, entities (e.g., remote vehicles) may maliciously transmit misleading information relating to the environmental awareness conditions to other vehicles to cause disruption among vehicles within a V2V communication network. Such misleading information may lead to vehicles slowing when an anticipated event is thought to be at a location reported. The slowing of traffic may cause traffic delays or stoppage, and even rear end collisions. Therefore, it would be beneficial if such misbehaviors could be identified.

SUMMARY OF INVENTION

An advantage of an embodiment is an estimation of a position of a remote vehicle either in motion or stationary from a host vehicle utilizing only a signal receiver of the host vehicle and a transmitter of the remote vehicle. This invention utilizes a periodic re-broadcasting of a transmitted signal and certain characteristics of the signal, for example time-of-flight, angle-of-arrival, and received signal strength at the receiver side of the host vehicle for estimating a location of the transmitter of the remote vehicle. For the purpose of illustration, a time-of-flight based approach; more specifically a time-difference-of-arrival of signal at the receiver side has been utilized in order to estimate the location of the transmitter of the remote vehicle. The positioning system records the position of the host vehicle and time-of-arrival of the received message at various reference points of the host vehicle and estimates the position of the vehicle transmitter using only the single receiver of the host vehicle. Based on a time-difference-of-arrival between the locations in which the host vehicle receiver receives the re-broadcast message, the host vehicle determines a location of the broadcasting entity. If a determination is made that location of the broadcasting entity is mobile, then an assumption is made that the broadcasting entity is misbehaving in transmitting spurious messages. The positioning system can increase position accuracy and strengthen communication security through higher probability of spurious message identification.

In addition, the locationing system as described herein may be used as supplemental position data for a global positioning system (GPS) when less than an optimum number of satellites are present for determining a GPS position, or may be used with other positioning techniques to supplement a vehicle's position.

The locationing system can also utilize other signal reception properties, for example the angle-of-arrival (also known as the direction-of-arrival) or strength of the received signal at various reference positions of the receiver of the host vehicle in order to locate the transmitter of the remote vehicle.

An embodiment contemplates an autonomous vehicle positioning system for determining a position of a remote vehicle relative to a mobile host vehicle based on safety alert messages broadcast from the remote vehicle relating to an event in a road of travel. A host vehicle communication unit communicates with the remote vehicle for receiving the broadcast messages from the remote vehicle. A host vehicle control unit identifies reference points along the road of travel. Each reference point identifies a position of the host vehicle and a signal reception property when the host vehicle receives the broadcast message. The control unit of the host vehicle selects a set of the reference points having identified positions and associated signal reception properties. The control unit utilizes the signal reception properties at each reference point associated with a received broadcast message. The control unit determines a position of the remote vehicle as a function of the signal reception properties at each selected reference point in the set.

An embodiment contemplates a method for determining a position of a remote vehicle relative to a mobile host vehicle based on safety alert messages broadcast from the remote vehicle relating to an event in a road of travel. The host vehicle receives broadcast messages from a remote vehicle. The broadcast message relates to a safety related event in the road of travel. The host vehicle control unit identifies reference points along the road of travel, each reference point identifying a position of the host vehicle and an associated time-of-arrival when the host vehicle receives the broadcast message. The control unit selects a set of the reference points having identified positions and associated times. The control unit determines a time difference-of-arrival between each reference point associated with a received broadcast message. The control unit determines a position of the remote vehicle as a function of the time difference-of-arrival between each selected reference points in the set.

An embodiment contemplates a method for determining a position of a remote vehicle relative to a mobile host vehicle based on safety alert messages broadcast from the remote vehicle relating to an event in a road of travel. The host vehicle receives broadcast messages from a remote vehicle. The broadcast message relating to a safety related event in the road of travel. The host vehicle control unit identifies reference points along the road of travel. Each reference point identifies a position of the host vehicle and an associated angle-of-arrival and an associated line-of-bearing for each reference point when the host vehicle receives the broadcast message. The control unit selects a set of the reference points having identified positions and associated angles and linesof-bearing wherein the control unit determines a position of the remote vehicle as the intersection point between two lines-of-bearing.

DETAILED DESCRIPTION

Figure 1:
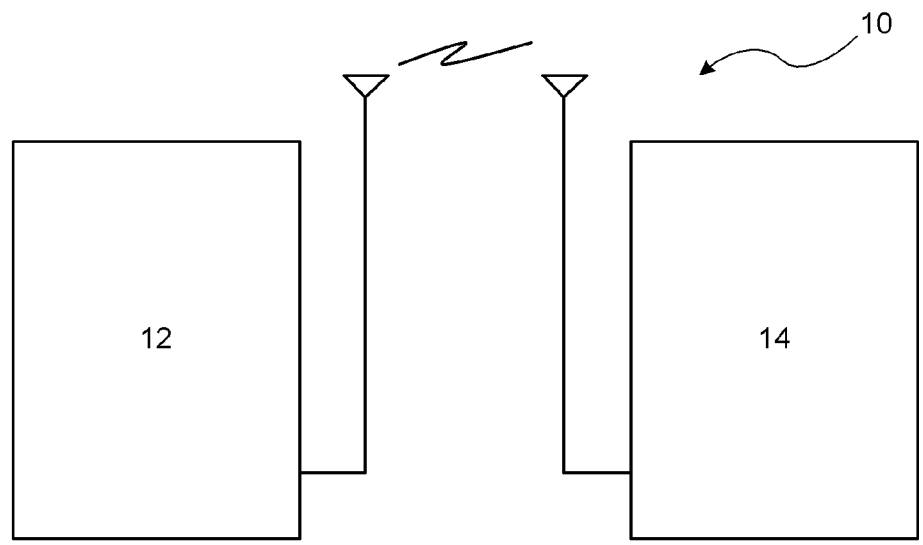
FIG. 1 is a block diagram of a communication system between a host vehicle and a remote vehicle.

FIG. 1 illustrates a block diagram of a vehicle communication system 10 for receiving messages between vehicles. Messages broadcast between vehicles may include vehicle-to-vehicle (V2V) communication messages that include, but are not limited to, post crash notification (PCN) messages. Vehicles disseminate the PCN messages containing information relating to the crash to other vehicles within a broadcast range for notification awareness of the location of the incident. In regards to vehicle safety applications, the objective for message dissemination is to reduce accidents by forewarning vehicle drivers of such conditions. For example, when a vehicle receives a PCN message, the receiving vehicle will determine whether the location of the accident as determined by the PCN message affects the receiving vehicle for taking corrective or precautionary actions. The receiving vehicle may also attempt to re-broadcast the message to other vehicles within its broadcasting range for alerting other vehicles of the existing condition.

A vehicle communication system 10 includes communication devices such as an on-board unit (OBU) for broadcasting messages between vehicles. A host vehicle OBU 12 is shown communicating with a remote vehicle OBU 14. Each respective OBU includes a broadcast message dissemination protocol 16 for wirelessly distributing the messages.

The message is broadcast between the host vehicle OBU 12 and the remote vehicle OBU 14 via their respective antennas. The system may use a dedicated short range communication protocol (DSRC), WiFi, or like system, as the communication protocol. The advantage of using the DSRC protocol is that it is designed and licensed for public safety applications. A typical message packet may contain the exact location of the vehicle broadcasting the message, thus providing a means for the vehicle receiving the message to know its exact relative location with respect to the broadcasting vehicle(s).

Figure 2:
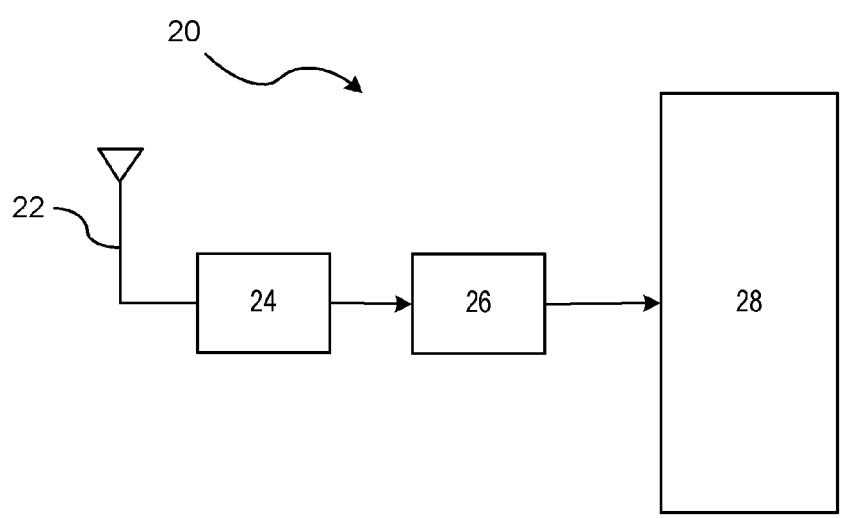
FIG. 2 is a block diagram of a broadcast message system of a vehicle in the vehicle communication system.

A broadcast message system 20 for each vehicle is shown in FIG. 2. Incoming messages received via a respective antenna 22 and transmitter/receiver 24 are processed by the respective hardware and driver devices of the radio receiver and communicated to the receiving stack where the incoming messages are received.

A received signal strength indicator (RSSI) 26 is obtained by the receiving circuit of the broadcast message system 20 for indicating signal strength of a respective received message. That is, when the vehicle receiver receives the new message packet, a receiving circuit measures the signal strength of the received wireless message. The RSSI 26 is provided to a controller 28 for determining the signal strength of the received signal broadcasting the message. The RSSI 20 is an indication of the power of the received signal.

The controller 28 executes a message misbehavior identification technique for determining whether the entity broadcasting the message is misbehaving. Misbehaving is defined as a malicious broadcast of spurious messages that provides incorrect location of the crash site event or similar event. The controller 28 will determine the accuracy of the location of the broadcast PCN message using any appropriate positioning methodologies which are based on signal reception properties, for example time-difference-of-arrival (TDOA) based multilateration system, angle-of-arrival (AOA) or received signal strength index (RSSI) based triangulation system.

In a traditional multilateration system for determining a position based on a transmitted signal, the traditional approach requires at least three fixed reference receivers with known positions. The receivers are assumed to be time synchronized and have an established back channel communication among the receivers. Such requirements add on cost and complexity to the traditional system. The concept of fixed reference nodes increases the infrastructure cost and imposes geographical constraints on the application of a localization system. Moreover, if the receivers are mobile, then computational complexity and implementation complexity increases significantly due to a difficulty in forming and maintaining a communication network, as well as maintaining synchronization among those cooperating members functioning as reference nodes.

Unlike traditional multilateration, the embodiments described herein do not require a plurality of fixed reference nodes or infrastructure nodes with known locations. Rather, the system utilizes a transmitting entity and a single mobile receiver while treating position coordinates of the single mobile receiver at which re-broadcast signals are received as reference points. The following describes how the reference points are determined. A PCN message is typically rebroadcast at 100 ms (10 Hz) time intervals. Therefore, a large number of reference points are generated at which re-broadcast messages are received. It should be understood that timed interval as described herein is exemplary, and other timed intervals may be selected that provides a sufficient number of reference points to select from. As a result, the embodiment described herein utilizes a single receiver that receives multiple occurrences of an event, whereas in the traditional positioning system, multiple receivers receive a single occurrence of an event.

The moving vehicle will receive the rebroadcast messages at regular intervals and at different locations. Each time the moving vehicle receives a rebroadcast message, the controller 28 will record a time of arrival of each PCN message, and at the same time, will record its own position at the time of the signal reception. The controller 28 will use its own position as reference points as opposed to having fixed nodes with known locations. As the vehicle receiving the re-broadcast messages moves along a route of travel, the controller 28 selects one or more sets of reference points for analyzing the TDOA. Each set of reference points includes a predetermined number of reference points (e.g., 3 or more). That is, the moving vehicle itself selects reference points from its own path of travel. The reference points that are selected for inclusion into a respective set of reference points can be determined based on one or more criterion. An example of one such criterion would be RSSI 26. By utilizing the RSSI 26, the controller 28 can select those signals that have a signal strength above a predetermined threshold, or may choose the reference points where the signals received at those reference points have the highest signal strength among the plurality of signals received at each of the reference points.

Given one or more sets of reference points and the respective time-of-arrival for each message, the controller 28 can determine a coordinate position of the entity transmitting the PCN message. For example, a set of reference points and the respective TDOA between the set of reference points are determined. Utilizing hyperboloids, a locus relating to the position of the transmitting entity is determined. In utilizing this technique, the absolute time at which the signal is transmitted is not required, rather only the time-of-arrival when the signal is received is needed.

Figure 3:
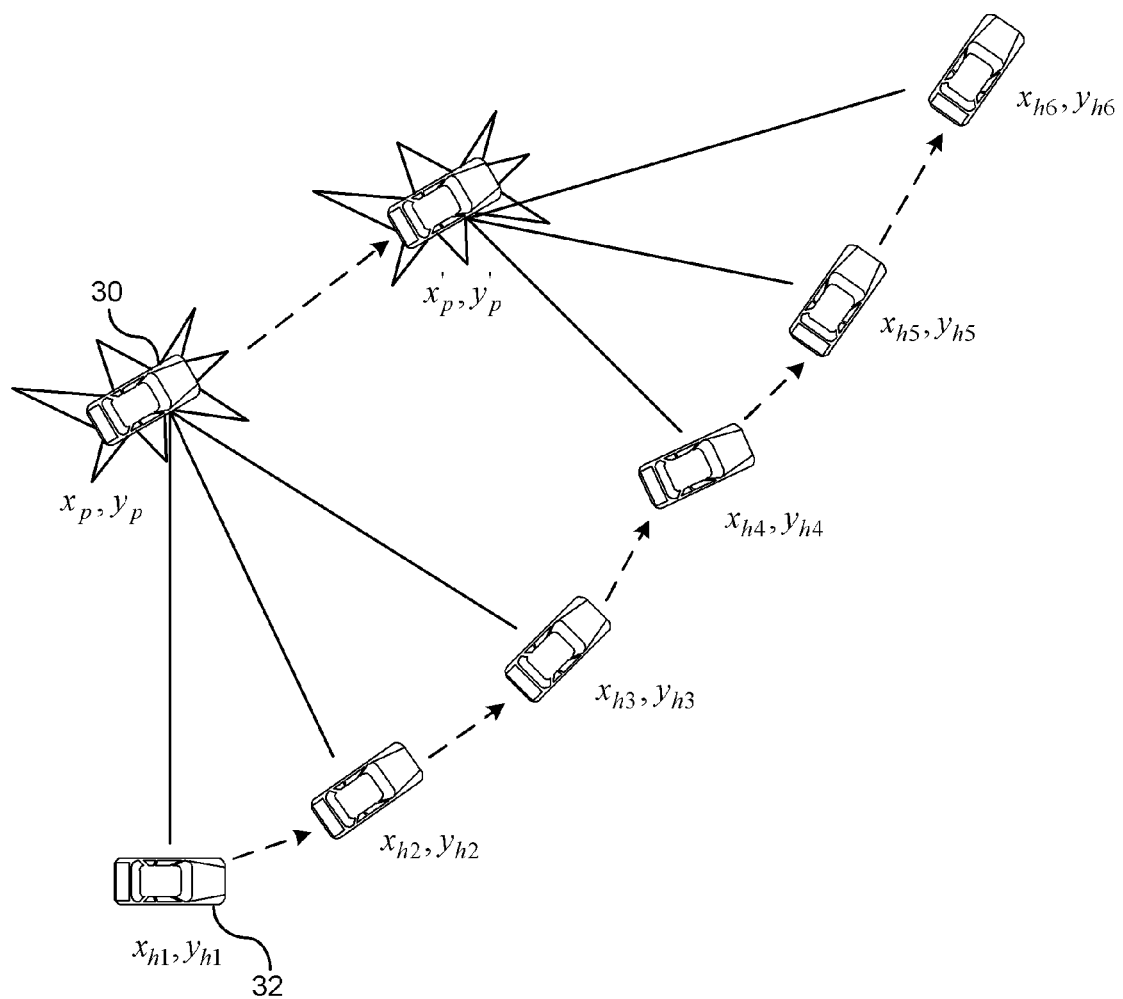
FIG. 3 illustrates a misbehavior identification technique according to a first embodiment.

FIG. 3 illustrates a technique for identifying misbehavior by determining whether the entity broadcasting the message, such as a PCN message, is stationary or mobile. In FIG. 3, the remote vehicle 30 is involved in an accident and broadcasts a PCN message. In a true PCN alert message, the remote vehicle 30 involved in the accident is stationary. Therefore, spurious messages and misbehaving nodes are identified if the position of the vehicle that the PCN message is broadcast from is not stationary in the road of travel. As in the case of a vehicle involved in the accident, a vehicle may be in the road of travel or may be located off the road (e.g., a predetermined distance from the lane or road of travel). If the determination is made that the vehicle transmitting the PCN message is either mobile or too far from the location of the accident, then the determination is that the PCN message is false thereby implying a spurious message or misbehaving node.

The PCN message is re-broadcast to a vehicle traveling in the same direction and as well as vehicles traveling in the opposite direction to the remote vehicle 30. Typically, the PCN message will identify a timestamp and location of the remote vehicle involved in the accident. Since the time-stamp on the data packet which bears the time-of-departure of the signal can be altered, the time-stamp is ignored and time-of-flight based positioning will not be utilized. Upon receiving the PCN message, all vehicles in both directions estimate the distance to the accident site and take precautionary actions (e.g., lane changes, braking, slowing down to stop). As a result, it is of the utmost importance to know the correct location of the accident site in order to ensure road safety and communication security so as to avoid spurious messages and misbehaving nodes.

In FIG. 3, assume that host vehicle 32 is mobile and is heading toward the accident site and receives the PCN signal. Host vehicle 32 attempts to estimate the position of the remote vehicle 30 with sufficient accuracy without any assistance from other vehicles within the V2V communication system or without the assistance from an infrastructure system. As the host vehicle 32 travels along a driven path, the re-broadcast signal transmitted at regularly time intervals is received at different reference points along the host vehicle's road of travel. Upon receiving a PCN message from the remote vehicle 30 at a respective location, the host vehicle 32 stores its current position $(x_1, y_1)$, time-of-arrival $(t_1)$, and RSSI of the received PCN signal. While the remote vehicle 30 periodically re-broadcasts the PCN message at timed intervals, the host vehicle 32 receives each re-broadcast PCN message and records its respective position, time-of-arrival, and RSSI of the received PCN signal. As a result, a plurality of reference points and associated metrics $(x_1, y_1, t_1), (x_2, y_2, t_2), (x_3, y_3, t_3) \ldots (x_n, y_n, t_n)$ are recorded for each PCN signal received.

A first set of reference points (e.g., 3 reference points) are selected from the plurality of reference points recorded. The first set of reference points may be selected utilizing the respective points having the highest RSSI. This assures that reference points with strong signal quality are selected which plays a significant role in position estimation accuracy. The position coordinates and the time of arrival of the PCN message at the receiving vehicle is used to calculate the location of the PCN transmitting entity using a TDOA technique. The TDOA technique is robust herein since the time-of-arrival is a valid metric which is free from synchronization error (i.e., the same receiver is receiving each re-broadcast message). As shown in FIG. 3, a first set of reference points $(x_{h1}, y_{h1}), (x_{h2}, y_{h2}), (x_{h3}, y_{h3})$ as selected by the controller is used to calculate a position of the entity transmitting the PCN message. The position of the transmitting entity is calculated and identified as $(x_p, y_p)$.

The controller thereafter selects a second set of reference points $(x_{h4}, y_{h4}), (x_{h5}, y_{h5}), (x_{h6}, y_{h6})$. The calculated location of the position of the transmitting entity based on the second set of reference points is identified as $(x'_p, y'_p)$. Additional calculations can be performed for additional sets of values. The technique shown in FIG. 3 relies on the difference, if any, in the calculated locations of the entity transmitting the PCN as determined by the different sets of reference points. A difference greater than a respective threshold between position $(x_p, y_p)$ and $(x'_p, y'_p)$ would indicate that the entity generating the PCN message is moving. If the entity is determined to be moving, then it is assumed that the entity is misbehaving and credibility of the message is greatly diminished.

Figure 4:
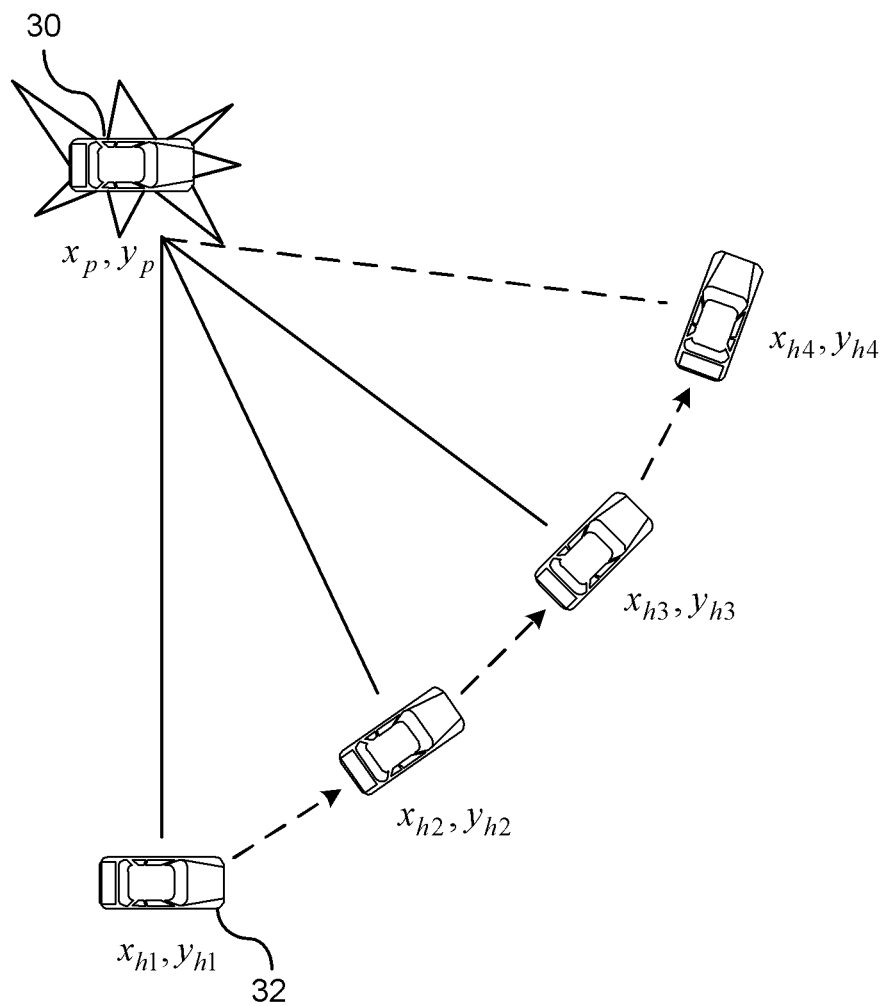
FIG. 4 illustrates a misbehavior identification technique according to a second embodiment.

FIG. 4 illustrates an alternative technique for determining misbehavior of a vehicle broadcasting a message. As shown in FIG. 4, the first set of reference points $(x_{h1}, y_{h1}), (x_{h2}, y_{h2}), (x_{h3}, y_{h3})$ selected by the controller is used to calculate a position of the entity transmitting the PCN message. The position is identified as $(x_p, y_p)$. The controller thereafter selects a fourth reference point $(x_{h4}, y_{h4})$. An estimated time-of-arrival $(t'_4)$ of the broadcast message at the fourth reference point $(x_{h4}, y_{h4})$ can be extrapolated from the host vehicle's receiver based on speed, direction, and previously calculated distance with reference to the PCN location $(x_p, y_p)$ as determined by the first set of coordinates. In addition, an actual time-of-arrival $(t_4)$ of the broadcast message is determined based on when the vehicle actually arrives at fourth reference point $(x_{h4}, y_{h4})$. A difference between the calculated time-of-arrival $(t'_4)$ and the actual time-of-arrival $(t_4)$ greater than a comparative threshold indicates that a spurious message or misbehaving node is present. Similar calculations utilizing different sets of reference points can be repeated to determine whether the transmitting entity is misbehaving.

Figure 5:
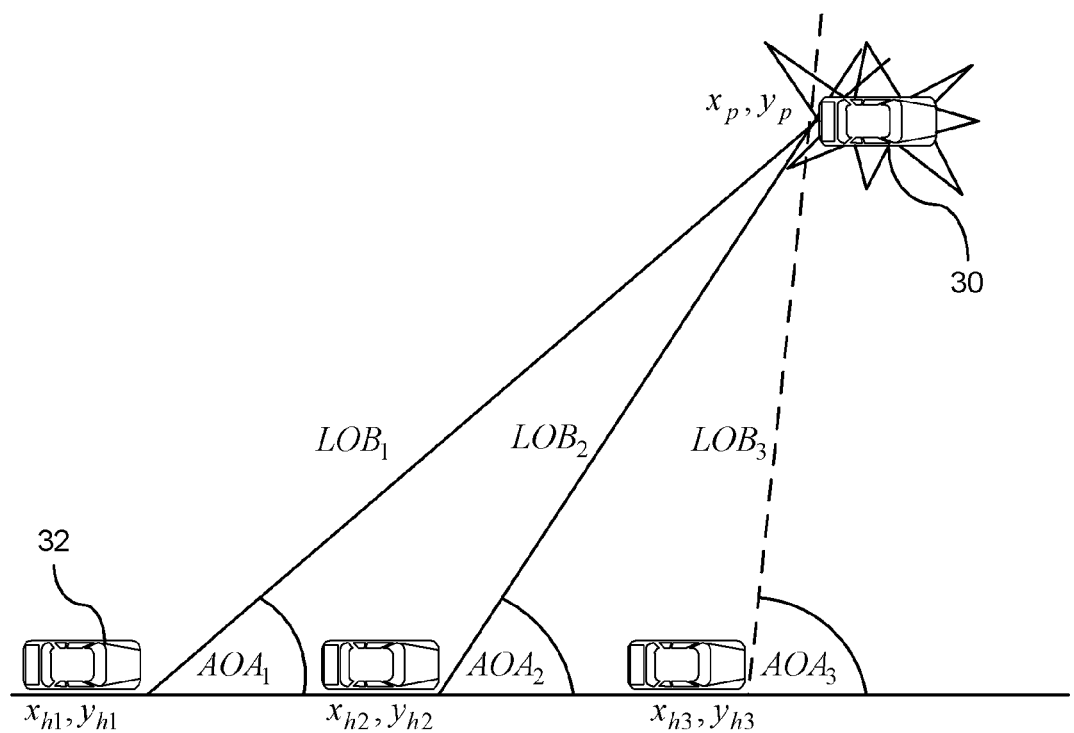
FIG. 5 illustrates a misbehavior identification technique according to a third embodiment.

It should be understood that other signal reception properties may be used in the techniques described above for determining a position of the remote vehicle. Such signal reception properties other than time-of-arrival may include angle-of-arrival (also known as direction-of-arrival) or received signal strength index for which AOA or RSSI based triangulation may be applied. For example, FIG. 5 illustrates a technique for determining a remote vehicle position as a function of the AOA. On receiving a broadcast message at the first reference point $(x_{h1}, y_{h1})$ a position of the host vehicle 32, a corresponding AOA of the broadcast message and a corresponding line-of-bearing $(LOB_1)$ are determined. Thereafter, the host vehicle 32 determines a position of the host vehicle 32, a corresponding AOA of the broadcast message, and a corresponding line-of-bearing $(LOB_2)$ at the second reference point $(x_{h2}, y_{h2})$. The line-of-bearing $(LOB_1)$ associated with the first reference point intersects with the line-of-bearing $(LOB_2)$ associated with the second reference point at $(x_p, y_p)$ and this is the estimated position of the remote vehicle 30 broadcasting the message. To gain more confidence in the estimated position, the host vehicle 32 can wait and receive additional broadcast messages from the remote vehicle 30. An identified position, AOA, and a line-of-bearing ($LOB_3$) are determined for a third reference point ($x_{h3}$, $y_{h3}$). A determination is made as to whether the line-of-bearing ($LOB_3$) intersects the location ($x_p$, $y_p$). If the additional lines-of-bearing (e.g., ($LOB_3$) do not match with the results of the earlier determined point of intersection ($x_p$, $y_p$), then there is an indication of possible misbehavior.

The advantages as described and shown herein are that a fixed or cooperative mode of communication is not required, and no synchronization is required between the communicating devices. No backchannel communication is needed among the fixed nodes.

It should be understood that each vehicle within a range of a broadcast PCN message is capable of estimating the source location of the PCN message. The process may involve more than one vehicle receiving the PCN message, and each vehicle can operate simultaneously and independently to track the position of the entity broadcasting the PCN message. The techniques as described herein do not require any mutual cooperation among the vehicles receiving the PCN message; however, a vehicle may choose to broadcast its estimated location of the PCN message to alert other users in the vicinity or to reconfirm its own calculation against one of the other receiving vehicle's estimation. Due to each receiving vehicle being capable of estimating the location of the vehicle broadcasting the PCN message independently, there is no synchronization error between the vehicles since synchronization of the receivers is not pertinent, and more specifically, there will be no difference in the performances of system hardware dedicated for position locationing, for example, GPS receiver. That is, GPS enable vehicles from multiple GPS manufactures have different receiver sensitivity which results in differences in position accuracy. However, the differences in the efficacy of the receivers from multiple manufacturers do not affect the results of the techniques described herein.

An inherent assumption in V2V communications is that each V2V enabled vehicle is equipped with a global positioning system (GPS). However, the functionality of GPS may be diminished in urban areas due to presence of large shadowing buildings which obstructs the line of sight with at least three satellites. In rural unmapped or sparsely mapped areas, the GPS may perform poorly as well. To circumvent the existing limitations of GPS, the proposed time-difference-of-arrival based system can be used as an alternative or complementary tool to the embedded GPS in V2V communications.

While certain embodiments of the present invention have been described in detail, those familiar with the art to which this invention relates will recognize various alternative designs and embodiments for practicing the invention as defined by the following claims.

What is claimed is:

1. An autonomous vehicle positioning system of a mobile host vehicle identifying malicious communication activity broadcast by a remote vehicle involved in an accident, the system comprising:

a host vehicle communication unit communicating with the remote vehicle for receiving safety alert broadcast messages from the remote vehicle, the safety alert broadcast messages including notification of the remote vehicle's involvement in the accident;

a host vehicle control unit identifying reference points along the road of travel, each reference point identifying a position of the host vehicle and a signal reception property when the host vehicle receives the safety alert broadcast message from the remote vehicle involved in the accident; and wherein the host vehicle control unit selects a set of the reference points having identified positions and associated signal reception properties, wherein the host vehicle control unit utilizes the signal reception properties at each reference point associated with the received safety alert broadcast message, wherein the host vehicle control unit determines a position of the remote vehicle as a function of the signal reception properties at each selected reference point in the set, wherein each reference point identifies a position of the host vehicle and associated signal reception properties when the host vehicle receives the safety alert broadcast message, wherein the host vehicle control unit determines whether the remote vehicle involved in the accident broadcasting the safety alert message is either mobile or not in a vicinity of the accident based on the associated signal reception properties at each reference point, and wherein the host vehicle control unit determines misbehavior by the remote vehicle involved in the accident if the determination is made that the remote vehicle is either mobile or not in a vicinity of the accident.

2. The system of claim 1 wherein the signal reception property includes an angle-of-arrival of the safety alert broadcast message, wherein each reference point identifies a position of the host vehicle, an angle-of-arrival of the safety alert broadcast message, and an associated line-of-bearing when the host vehicle receives the safety alert broadcast message, wherein the control unit of the host vehicle selects a set of the reference points having identified positions, associated angles-of-arrival, and associated lines-of-bearing, wherein the control unit determines a point of intersection between two respective lines-of-bearing corresponding to two reference points associated with received safety alert broadcast messages, and wherein the control unit determines a position of the remote vehicle as the intersection point between two lines-of-bearing.

3. The system of claim 1 wherein the signal reception property includes a time-of-arrival of the safety alert broadcast message, wherein each reference point identifies a position of the host vehicle and an associated time-of-arrival when the host vehicle receives the safety alert broadcast message, wherein the host vehicle control unit selects a first set of the reference points having identified positions and associated times, wherein the control unit determines a time difference-of-arrival between each reference point associated with a received safety alert broadcast message, and wherein the host vehicle control unit determines the position of the remote vehicle as a function of the time difference-of-arrival between each selected reference point in the first set.

4. The system of claim 3 wherein the control unit selects a next set of reference points for determining a position of the remote vehicle based on a time difference-of-arrival between each received safety alert broadcast message of the next set of reference points, wherein the host vehicle control unit determines a position of the remote vehicle as a function of the time difference-of-arrival between each reference point of the next set of selected reference points, wherein the host vehicle control unit compares the position of the remote vehicle as determined by the first set of reference points with the position as determined by the next set of reference points, and wherein the host vehicle control unit determines misbehavior by the remote vehicle if the distance between determined positions is greater than a predetermined distance threshold.

5. The system of claim 3 wherein a next reference point is selected by the host vehicle control unit, wherein the location and time of arrival for the next reference point are identified, wherein the host vehicle control unit determines an expected time-of-arrival of the safety alert broadcast message at the next reference point position of the host vehicle, and wherein the host vehicle control unit determines a difference between the identified time-of-arrival of the safety alert broadcast message at the next reference point of the host vehicle and the actual time-of-arrival of the safety alert broadcast message at the next reference point of the host vehicle, and wherein the host vehicle control unit determines a misbehavior by the remote vehicle if the difference between the identified time-of-arrival and the expected time-of-arrival is greater than a predetermined threshold.

6. The system of claim 5 wherein the host vehicle control unit identifies additional reference points and associated times-of arrival, and wherein misbehavior by the remote vehicle is determined if the difference between the identified time-of-arrival and the expected time-of-arrival of any one of the additional reference points is greater than the predetermined threshold.

7. The system of claim 1 wherein a received signal strength indicator is determined for each safety alert broadcast message received by the host vehicle, wherein the host vehicle control unit selects each of the respective reference points based on a value of the received signal strength indicator.

8. The system of claim 7 wherein the host vehicle control unit selects each of the respective reference points based on the value of the received signal strength indicator being above predetermined signal strength.

9. The system of claim 7 wherein the host vehicle control unit prioritizes the safety alert broadcast messages based on the values of the received signal strength indicators, wherein the host vehicle control unit selects each of the respective reference points based on the reference points having a highest value of signal strength indicator among the identified reference points along the road of travel.

10. The system of claim 1 wherein the vehicle communication system is a vehicle-to-vehicle communication system.

11. The system of claim 10 wherein the vehicle-to-vehicle communication system is a dedicated short range communication system.

12. The system of claim 1 wherein the set of reference points includes at least three reference points.

13. The system of claim 1 wherein the next set of reference points includes at least three reference points.

14. The system of claim 1 wherein the remote vehicle broadcasting unit broadcasts safety alert messages at timed intervals.

15. The system of claim 14 wherein the remote vehicle broadcasting unit broadcasts safety alert messages at ten times per second.

16. The system of claim 1 wherein the safety alert message is a post crash notification message.

17. A method of identifying malicious communication activity broadcast by a remote vehicle involved in an accident along a road of travel, the method comprising the steps of:
  receiving, by a mobile host vehicle, safety alert broadcast messages from a remote vehicle, the safety alert broadcast messages relating to the remote vehicle's involvement in the accident;
  identifying, by the host vehicle control unit, reference points along the road of travel, each reference point identifying a position of the host vehicle and an associated time-of-arrival when the host vehicle receives the safety alert broadcast message;
  the host vehicle control unit selecting a set of the reference points having identified positions and associated times; and
  the host vehicle control unit determining a time difference-of-arrival between each reference point associated with a received safety alert broadcast message, wherein the host vehicle control unit determines a position of the remote vehicle as a function of the time difference-of-arrival between each selected reference points in the set, wherein the host vehicle control unit determines whether the remote vehicle involved in the accident broadcasting the safety alert messages is either mobile or not in a vicinity of the accident, and wherein the host vehicle control unit determines misbehavior by the remote vehicle involved in the accident if the determination is made that the remote vehicle is either mobile or not in a vicinity of the accident.

18. The method of claim 17 further comprising the steps of:
  the host vehicle control unit selecting a next set of reference points for determining a position of the remote vehicle based on a time difference-of-arrival between each received safety alert broadcast message of the next set of reference points;
  determining a position of the remote vehicle as a function of the time difference-of-arrival between each reference point of the next set of selected reference points;
  comparing the position of the remote vehicle as determined by the first set of reference points with the position as determined by the next set of reference points; and
  the control unit determining misbehavior of the remote vehicle if the distance between determined positions is greater than a predetermined distance threshold.

19. The method of claim 17 further comprising the steps of:
  selecting a next reference point by the control unit;
  identifying a location and time of arrival for the next reference point;
  determining an expected time-of-arrival of the safety alert broadcast message at the next reference point position of the host vehicle;
  determining a difference between the identified time-of-arrival of the broadcast message at the next reference point of the host vehicle and the actual time-of-arrival of the safety alert broadcast message at the next reference point of the host vehicle;
  determining a misbehavior of the remote vehicle by the host vehicle control unit if the difference between the identified time-of-arrival and the expected time-of-arrival is greater than a predetermined threshold.

20. The system of claim 19 further comprising the steps of:
  identifying additional reference points and associated times-of arrival by the control unit; and
  determining misbehavior of the remote vehicle determined if the difference between the identified time-of-arrival and the expected time-of-arrival of any one of the additional reference points is greater than the predetermined threshold.

21. The method of claim 17 further comprising the steps of:
  determining a received signal strength indicator for each safety alert message received by the host vehicle;
  selecting each of the respective reference points by the control unit based on a value of the received signal strength indicator.

22. A method for determining a position of a remote vehicle relative to a mobile host vehicle based on safety alert messages broadcast from the remote vehicle relating to an event in a road of travel, the method comprising the steps of:

the host vehicle receiving safety alert broadcast messages from a remote vehicle, the safety alert broadcast message relating to a safety related event in the road of travel;

a host vehicle control unit identifying reference points along the road of travel, each reference point identifying a position of the host vehicle and an associated angle-of-arrival when the host vehicle receives the safety alert broadcast message;

the host vehicle control unit selecting a set of reference points having identified positions; and the host vehicle control unit determining an angle-of-arrival and line-of-bearing at each reference point associated with a received safety alert broadcast message, wherein the host vehicle control unit determines whether the remote vehicle involved in the accident broadcasting the safety alert message is either mobile or not in a vicinity of the accident, and wherein the host vehicle control unit determines misbehavior by the remote vehicle involved in the accident if the determination is made that the remote vehicle is either mobile or not in a vicinity of the accident.

23. The method of claim 22 further comprising the steps of:

identifying, by the host vehicle control unit, a position of the host vehicle, an angle-of-arrival of the safety alert broadcast message, and an associated line-of-bearing for each reference point when the host vehicle receives the safety alert broadcast message;

selecting, a set of the reference points having identified positions, associated angles-of-arrival, and associated lines-of-bearing;

determining a point of intersection between two respective lines-of-bearing corresponding to two reference points associated with received safety alert broadcast messages; and determining a position of the remote vehicle as the intersection point between two lines-of-bearing.

24. The method of claim 22 further comprising the steps of:

selecting a next reference point by the host vehicle control unit;

identifying a position of the host vehicle, an angle-of-arrival of the safety alert broadcast message, and an associated line-of-bearing when the host vehicle receives the safety alert broadcast message at the next reference point;

determining whether the line-of-bearing for the next reference point intersects the intersection point determined by the set of reference points for evaluating a reliability of the position of the remote vehicle;

determining misbehavior by the remote vehicle involved in the accident if the determination is made that the remote vehicle is not at the substantially same position based the next reference point not intersecting the intersection point determined for the set of reference points the next reference point and the intersection point set of reference points.

* * * * *